United States Patent [19]

Wallace

[11] 3,946,757

[45] Mar. 30, 1976

[54] FUEL METERING VALVE

[75] Inventor: Albert M. Wallace, Westmont, N.J.

[73] Assignee: TRW Inc., Los Angeles, Calif.

[22] Filed: Mar. 28, 1975

[21] Appl. No.: 562,871

[52] U.S. Cl. .................... 137/501; 137/85; 251/30; 251/65

[51] Int. Cl.[2] .......................................... F16K 31/00

[58] Field of Search ........... 137/501, 84, 85, 86, 83, 137/82, 13, 487.5; 73/194 E; 251/65

[56] References Cited

UNITED STATES PATENTS

| | | | |
|---|---|---|---|
| 2,255,787 | 9/1941 | Kendrick | 137/501 X |
| 3,023,763 | 3/1962 | Lanctot | 137/85 |
| 3,101,650 | 8/1963 | Blanton | 137/85 X |
| 3,339,573 | 9/1967 | Bahniuk | 137/85 |
| 3,552,433 | 1/1971 | Mason | 137/85 X |
| 3,675,676 | 7/1972 | O'Connor | 137/501 |
| 3,853,142 | 12/1974 | Grundman | 137/501 X |
| 3,865,014 | 2/1975 | Van der Kolk | 137/501 X |

*Primary Examiner*—Martin P. Schwadron
*Assistant Examiner*—Robert J. Miller
*Attorney, Agent, or Firm*—Poms, Smith, Lande & Glenny

[57] ABSTRACT

A metering valve assembly for accurately controlling the flow of fluid independent of the pressure fluctuations at the input or at the output of the metering valve assembly. An electrical coil mounted on the assembly housing controls the position of an armature of an electromagnet in a permanent magnet field which, in conjunction with a nozzle assembly transmits pressure through suitable conduits to control a first slider valve. The displacement of the first slider valve controls the opening of a port area so that the flow through the port area is a function of the differential pressure developed across the port area with the output of the port directed through suitable conduit means to a second slider in the valve which is opposed to the upstream pressure of the metering valve. The second slider controls the opening and closing of another port which controls the flow of fluid through the output of the metering valve assembly to maintain the differential pressure across the first slider valve constant for all flows, downstream pressure changes, and upstream pressure changes to thereby render the flow of fluid a function of the electrical signal applied to the coil of the electromagnet.

11 Claims, 4 Drawing Figures

Fig. 1.
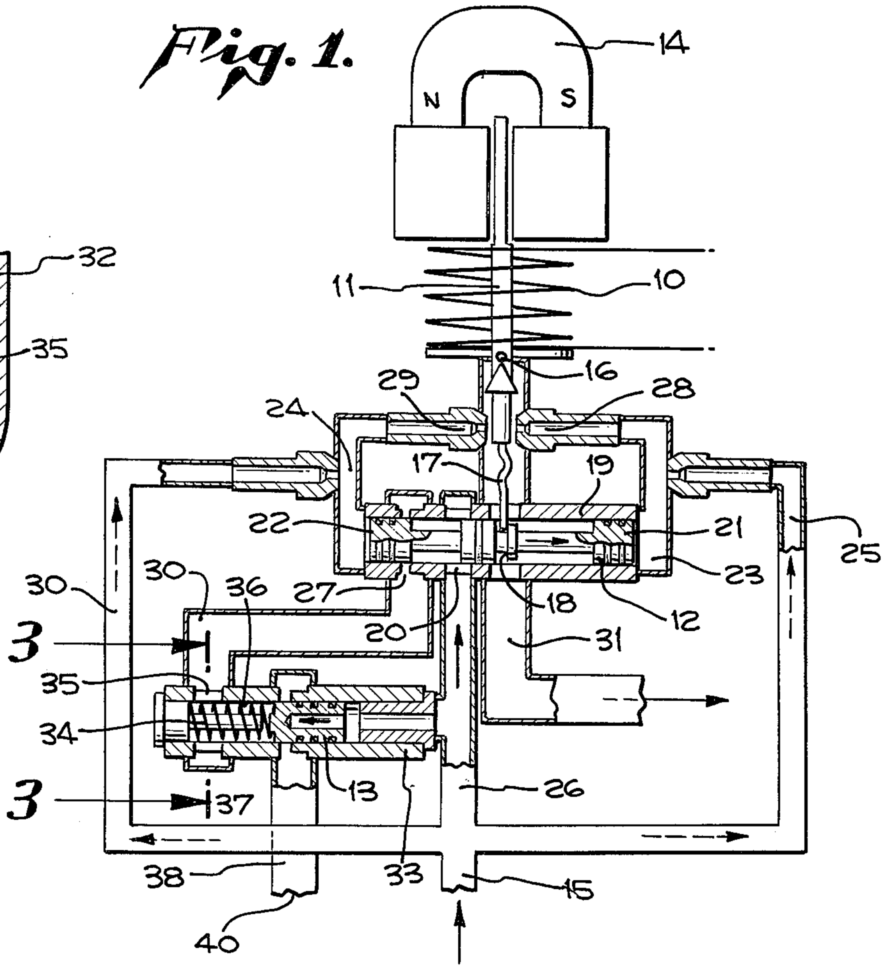
Fig. 3.
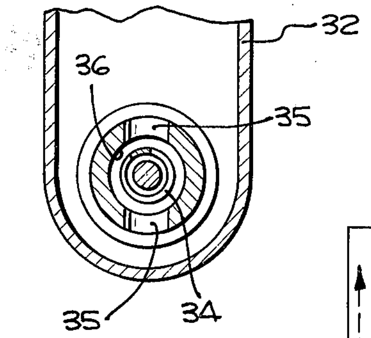
Fig. 4.
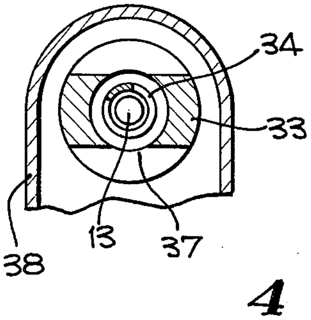
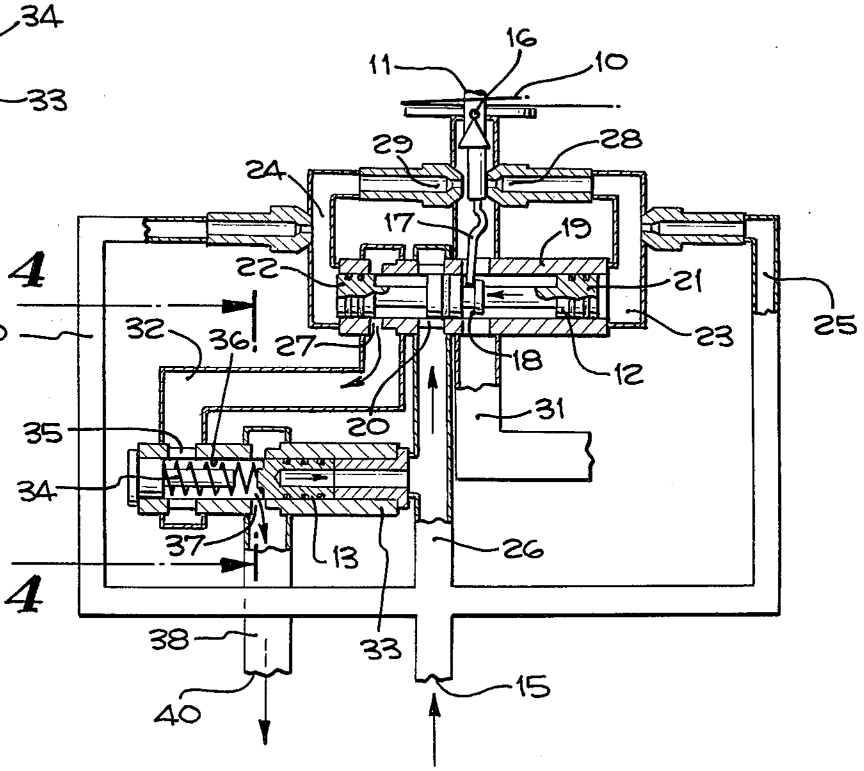
Fig. 2.

FUEL METERING VALVE

BACKGROUND OF THE INVENTION

The present invention relates to a metering valve and more particularly to a valve assembly for controlling the flow of fluid independent of the pressure fluctuations at the input and the output of the assembly.

The need for an electro-fluid-flow valve for use in automobiles has been necessitated by various government regulations regarding pollution control and fuel economy. It has therefore become economical to use electronic devices for automotive engine control. Such electronic devices seek to control the flow of fuel to the engine as a function of an electrical signal. These devices seek to render the flow of fuel independent of pressure fluctuations at the input and the output of the metering valve assembly and completely dependent on the electrical signal to the fluid flow assembly.

Typical prior art devices sought to achieve control of fuel flow independent of the pressure fluctuations by measuring the flow of fuel and then developing and electrical signal which is an analog function of the fuel flow. The electrical signal is monitored by an electronic device which controls the opening of an electro-fluid-flow valve as a function of pressure drop measurements which were also converted to electrical signals and monitored by the same electronic device. This prior art technique requires two relatively expensive measurement transducers. It also requires the complicated electronics required to regulate the flow with reasonable accuracy.

Such typical prior art devices are relatively expensive in view of the need for hardward to measure both fluid flow and pressure. They also require compensating circuits in the electronics to regulate the flow accurately.

SUMMARY OF THE INVENTION

The present invention provides a metering valve for controlling the flow of fluid independent of pressure fluctuations at the input or at the output of the assembly. To attain this, the invention provides an electromagnet assembly which is operative in response to an electrical signal to control the position of a first slider valve. The position of the first slider valve in turn controls the position of a second slider valve which controls the opening and closing of an output port. The net result is the control of the flow through an output port as a function of the electrical signal, applied to the electromagnet.

In the preferred embodiment, the assembly is mounted to a housing having a plurality of conduits. Electromechanical means is carried by the housing. In the preferred embodiment, the electromagnet includes a permanent magnet having a pair of poles which provides a magnetic field with an armature in the form of an iron bar between the poles of the permanent magnet. An electrical coil is wrapped around the bar and the terminals are suitably connected to be responsive to an electrical signal.

The bar is normally positioned on opposite sides of a pair of nozzles to control the flow of fluids through the nozzles. The first slider is mounted in a casing in the housing and the conduits from the fuel pump to each of the two nozzles are also respectively connected to the casing to apply hydraulic pressure to opposite sides of the first slider. When a signal is applied to the electromagnet, the armature bar is displaced to change the differential in fluid flow between the two nozzles to correspondingly change the pressure differential against the opposite sides of the first slider. The movement of the slider valve is dampened by a feedback spring securely mounted to the armature and positioned to abut a shoulder on the first slider valve. The spring causes the first slider valve to return to its quiescent position when there is no control current.

A conduit from the fuel supply system is directed to the chamber which houses the first slider valve and a second conduit is also connected to communicate with the chamber in which the first slider valve is positioned. The first slider valve has shoulders which permit communication between the first conduit and the second conduit in accordance with the position of the first slider valve. Since the position of the first slider valve is a function of the differential pressure developed between the opposite ends of the first slider valve, the flow of fluid from the first conduit to the second conduit is therefore a function of the differential pressure between opposite sides of the first slider valve.

The second conduit is directed to the second slider valve which is positioned to be opposed by the upstream pressure of the fuel pump. The position of the second slider valve controls the opening and closing of another port which controls the output flow of fuel from the metering valve assembly. A spring is formed around the second slider valve to maintain the differential pressure across the second slider valve constant for all flows, downstream pressure changes and upstream pressure changes.

Thus, the position of the second slider valve is a function of the position of the first slider valve. This position of the first slider valve in turn is a function of the electrical signal applied to the coil of the electromagnet. The present invention thereby combines an electrohydaulic valve and a pressure control valve in one assembly in a novel and non-obvious manner.

Accordingly, an object of the present invention is to provide a valve assembly which controls the flow of fluid as a function of an electrical signal.

Another object is to provide means to control the position of a first slider of fuel assembly valve in response to the position of an electromagnet.

Yet another object is to provide means to control the position of the second slider of a metering valve in response to the position of a first slider of the metering valve.

Still another object is to provide a slider apparatus for controlling the flow of fluid from a metering valve independent of the upstream and downstream pressure changes in the metering valve assembly.

A further object is to provide means to maintain the differential pressure across a slider valve constant for all flows downstream pressure changes and upstream pressure changes.

Other objects, advantages and novel features of the present invention will become apparent from the following detailed description of the invention when considered in conjunction with the accompanying drawings.

BRIEF DESCRIPTION OF THE DRAWINGS

FIG. 1 is a detailed view of the assembly;

FIG. 2 is a view of the assembly with the slider valve positioned to permit flow of fluid through the assembly;

FIG. 3 is a sectional view of FIG. 1 taken along the plane III—III of FIG. 1; and FIG. 4 is a sectional view of FIG. 2 taken along the plane IV—IV of FIG. 2.

DESCRIPTION OF THE INVENTION

Referring now to FIG. 1, there is shown a housing for containing the assembly and transmitting fluid pressure through a plurality of conduits. The housing has an input port 15 and an output port 40 as shown. Electromechanical means is shown carried by the housing. In the preferred embodiment, the electromechanical means is an electromagnet having a coil 10 through which an electrical signal is transmitted to control the the position of an armature 11. The position of the armature 11 in turn controls the displacement of first slider means shown in the form of a first slider 12 which in turn controls the position of second slider means shown in the form of a second slider 13. The position of the second slider 13 controls the output flow of fluid. Thus the output flow of fluid is a function of the current through the coil 10.

The electromechanical means includes an electromagnet assembly shown mounted to the housing and operative to control the displacement of the first slider 12.

The electromagnet includes a permanent magnet 14 having opposite poles with the armature 11 mounted therebetween as shown. The armature is essentially an iron bar which is flat between the two poles of the electromagnet and circular in cross section in the lower portion thereof. The armature is mounted on a suitable pivot 16 and the lower portion extends downwardly into the conduit 31.

In the quiescent position, when no current is transmitted through the coil 10, the lower portion of the armature 11 is in the vertical position as shown in FIG. 1. Spring means 17 in the form of a feedback spring is secured to the bottom of the armature and attached to rotate with the armature. The spring is preferably in the form of flat wire and the bottom portion of the spring is urged against a shoulder 18 of the first slider 12. The spring force ordinarily urges the shoulder 18 of the slider 12 to the right. The feedback spring aids in maintaining an equilibrium between the armature 11 and the first slider 12.

The slider 12 is in a casing 19 and a right-hand piston 21 communicates with a conduit 23 and a left-hand piston communicates with a conduit 24 as shown. The casing 19 has an input port 20 and an output port 27 as shown. The slider 12 also communicates with and input conduit 26 having an input port 15 which provides pressure from a fuel pump. In the preferred embodiment the input pressure is in the order of 50 psi.

In the quiescent position as shown in FIG. 1, the fluid is transmitted via conduit 25 to a right-hand nozzle 28 and via conduit 30 to left-hand nozzle 29. The fluid is transmitted through a return conduit 31 which returns the fluid back to the source. When the valve is used to control the flow of fuel in an automobile, the return conduit 31 returns the fuel to the gas tank.

When a current of an electrical signal is applied to the coil 10, the armature 11 rotates in the counterclockwise direction as shown in FIG. 2. The counterclockwise rotation of the armature 11 reduces the flow through nozzle 28 and correspondingly increases the flow through nozzle 29 thereby reducing the pressure on the left-hand piston 22 of the first slider 12 and correspondingly increasing the pressure on the right-hand piston 21 of the first slider 12. This causes the first slider 12 to slide in the left-hand direction. The displacement of the armature 11 causes the feedback spring 17 to act as a lever to urge the first slider 12 to the right. At the same time, the spring offers a reaction force against the armature 11 to urge it to rotate in the clockwise direction to aid in maintaining the system in equilibrium.

The displacement of the first slider 12 to the right thereby increases the fluid flow from the input conduit 26 through input port 20 of the casing 19 to output port 27. The fluid is transmitted via conduit 32 to an input port 35 of a casing 33. The fluid communicates there with the second slider 13.

The second slider is urged to the right by the force of the out flowing fluid plus the force of the spring 34 against the shoulders of the second slider. The fluid is transmitted through passages 36 as shown in FIG. 3 and apply pressure to the left-hand side of the second slider 13 as shown. The combined force of the fluid and the spring 34 is opposed by the upstream pressure from the fuel pump against the right-hand side of the slider 13. The positioning of the spring 34 maintains the differential pressure across the second slider 13 constant for all flows, downstream pressure changes and upstream pressure changes.

The displacement of the second slider 13 to the right permits fluid to be transmitted through the input conduit 26, input port 20 of casing 19, output port 27, conduit 32, input ports 35 of casing 33 through the passage 36 to an output port 37 of casing 33 as shown in FIGS. 2 and 4. In the use of the valve assembly for an automobile fuel control device, the fuel is transmitted through an output conduit 38 through output port 40 to the manifold of the fuel system. The position of the second slider 13 is thereby maintained as a function of the current through the coil 10 and is independent of the pressure fluctuations at either the input or the output of the metering valve assembly.

In the preferred embodiment, the feedback spring 17 may be a flat leaf spring in the form of a piece of wire. Ordinarily, when a current is applied to the coil 10, the rotation of the armature 11 in the counter-clockwise direction is stabilized by the pressure from the feedback spring 17 against the shoulder 18 of the first slider 12.

In a system which provides approximately 50 pounds per square inch of pressure from a fuel pump to the input conduit 26, the system may provide approximately 0.1 gallons per minute to the output manifold and transmit approximately 0.2 gallons per minute through the return conduit 21 to the fuel tank.

Obviously, many modifications and variations of the present invention are possible in light of the above teachings. It is therefore to be understood that within the scope of the appended claims the invention may be practiced otherwise than as specifically described.

I claim:

1. A fluid metering valve assembly for controlling the flow of fluid as a function of an electrical signal comprising:

a housing for containing the assembly and transmitting fluid pressure, said housing including an assembly input port and an assembly output port, electromechanical means carried by said housing and including an armature operative in response to the electrical signal to provide a mechanical displacement, a pair of nozzles mounted in said housing and operative in conjunction with said armature whereby the displacement of said armature controls the flow of fluid through said pair of nozzles, first slider means mounted in said housing and operatively responsive to a change in fluid pressure through said pair of nozzles caused by said mechanical displacement of said armature of said electromechanical means to be displaced in accordance with the displacement provided by said armature, second slider means mounted in said housing and operatively responsive to a change in fluid pressure caused by the displacement of said first slider means to control the flow of fluid through the assembly as a function of the electrical signal, and spring means secured to said armature of said electromechanical means and positioned to bias said first slider means to further maintain said first slider in equilibrium.

2. The assembly as described in claim 1 and wherein said electromechanical means is an electromagnet.

3. The assembly as described in claim 2 and wherein said electromagnet includes, a permanent magnet having a pair of poles, said armature having a section positioned between said poles, and a coil wrapped around said armature and coupled to receive the electrical signal to provide said mechanical displacement.

4. The assembly as described in claim 1 and wherein said housing further includes a plurality of conduits for transmitting said fluid pressure between said electromechanical means and said first slider means whereby said displacement of said electromechanical means controls the fluid pressure applied to said slider to displace said slider in accordance with the displacement provided by said electromechanical means.

5. The assembly as described in claim 1 and wherein said housing includes a casing in which said first slider is mounted with said casing including an input port through which fluid is transmitted into the assembly, and an output port through which fluid is transmitted, whereby the displacement of said first slider controls the flow of fluid between said input port and said output port.

6. The assembly as described in claim 1 and wherein said housing includes a casing in which said second slider is mounted with said casing including an input port through which fluid is transmitted, and an output port through which fluid is transmitted as a function of the input fluid flow.

7. The assembly as described in claim 1 and wherein said housing includes:

a first casing having a first casing input port for communicating with said assembly input port, said first casing further including a first casing output port, and a second casing having a second casing input port for communicating with said first casing output port and a second casing output port for communicating with said assembly output port for transmitting fluid through the assembly at a rate determined by the electrical signal.

8. A fluid metering valve for controlling the flow of fluid comprising:

a housing having a plurality of conduits, an electromagnet assembly carried by said housing, said electromagnet assembly including an armature and a coil wrapped therearound with said coil coupled to pass an electrical signal to control the displacement of said armature, a plurality of valve slider means mounted within said housing, said plurality of valve slider means including a first slider valve and a second slider valve with said first slider valve mounted within said housing to be displaced as a function of the displacement of said armature and said second slider valve mounted within said housing to be displaced as a function of the displacement of said first slider valve to thereby provide control of the flow of fluid as a function of said electrical signal, and a feedback spring coupled between said armature and said first slider and operative in conjunction with hydraulic pressure from fluid in said conduits to maintain an equilibrium between said armature and said first slider.

9. An electro-fluid-flow valve comprising:

electrical means responsive to an electrical signal, said electrical means including;

a permanent magnet having a pair of poles, a displaceable armature having a section positioned between said poles, and a coil wrapped around said armature and coupled to receive said electrical signal for controlling the displacement of said armature;

a housing for containing the valve and transmitting fluid pressure, said housing including a first casing having a first casing input port and a first casing output port, said housing further including a second casing having a second casing input port and a second output port, a first slider mounted in said first casing and operative to be displaced in response to fluid pressure controlled by said armature of said electrical means, and a second slider mounted in said second casing and operative to be displaced in response to fluid pressure controlled said first slider, whereby said electrical signal controls the displacement of said armature to control the position of said first slider to control the flow of fluid through said first casing input port and said first casing output port to thereby control the flow of fluid through said second casing input port and said casing output port.

10. The valve as described in claim 9 and further including a spring secured to said displaceable armature and mounted to bias said first slider to maintain the pressure across said first slider independent of changes in fluid pressure at said first casing input port and said second casing output port.

11. A metering valve assembly for accurately controlling the flow of fluid therethrough comprising:

a housing having conduit means through which said fluid is transmitted, an electromagnet assembly carried by said housing, said electromagnet assembly including an armature and a coil wrapped therearound with said coil coupled to pass an electrical signal to control the displacement of said armature, a pair of nozzles each connected to said conduit means and operative in conjunction with said armature whereby the displacement of said armature relative to said pair of nozzles controls the flow of fluid through each of said nozzles, a first valve slider having pistons at opposite ends with each of said pair of conduits positioned to transmit fluid pressure caused by the displacement of said armature relative to each of said nozzles to each of said pistons to thereby provide displacement of said first slider with said conduit means connected to transmit fluid pressure between said pair of nozzles and said first valve slider means to control the displacement of said first valve slider, and a second valve slider in said housing and operatively responsive to fluid pressure determined by the position of said first slider to control the flow of fluid through the metering valve.

* * * * *